United States Patent [19]

Levek et al.

[11] 4,089,912

[45] May 16, 1978

[54] STABILIZED FLAME-RETARDANT STYRENIC POLYMER COMPOSITIONS AND THE STABILIZING FLAME-RETARDANT MIXTURES USED THEREIN

[75] Inventors: Robert P. Levek; David O. Williams, both of West Lafayette, Ind.

[73] Assignee: Great Lakes Chemical Corporation, West Lafayette, Ind.

[21] Appl. No.: 709,512

[22] Filed: Jul. 28, 1976

[51] Int. Cl.$^2$ .......................... C08K 3/20; C08K 5/13; C09K 3/28; C09K 15/32

[52] U.S. Cl. ..................................... 260/862; 252/8.1; 252/400 R; 260/45.75 T; 260/889; 260/897 B; 260/901

[58] Field of Search ................. 260/45.75 T, 862, 889, 260/897 B, 901; 252/8.1, 400 R

[56] References Cited

U.S. PATENT DOCUMENTS

| | | | |
|---|---|---|---|
| 2,661,347 | 12/1953 | Wesp et al. | 260/30.6 R |
| 3,310,509 | 3/1967 | Fukumoto et al. | 260/45.75 T |
| 3,398,114 | 8/1968 | Pollock | 252/400 R |
| 3,419,749 | 12/1968 | Bridger | 252/400 R |
| 3,442,980 | 5/1969 | Grabowski | 260/880 R |
| 3,530,069 | 9/1970 | O'Neill | 252/400 R |
| 3,793,401 | 2/1974 | Nield et al. | 260/887 |
| 3,907,932 | 9/1975 | Kennedy et al. | 260/880 R |

FOREIGN PATENT DOCUMENTS

881,578   11/1961   United Kingdom.

*Primary Examiner*—Donald E. Czaja
*Assistant Examiner*—H. H. Fletcher
*Attorney, Agent, or Firm*—Kirkland & Ellis

[57] ABSTRACT

This application discloses stabilized flame-retardant styrenic polymer compositions comprising a bromine-containing flame-retardant, antimony trioxide and a three component stabilizer comprising a dialkyltin maleate, a hindered phenolic antioxidant, and a member selected from the group consisting of anhydrides of a cyclic dicarboxylic acid, ester derivatives thereof, imide derivatives thereof, and monomeric and dimeric polyesters.

16 Claims, No Drawings

STABILIZED FLAME-RETARDANT STYRENIC POLYMER COMPOSITIONS AND THE STABILIZING FLAME-RETARDANT MIXTURES USED THEREIN

BACKGROUND OF THE INVENTION

1. Field of the Invention

This invention relates to flame-retardant compositions and more particularly to stabilized flame-retardant styrenic polymer compositions.

2. Description of the Prior Art

The prior art has taught the use of a variety of flame-retardant agents for use in styrenic compositions such as polystyrene, acrylonitrile-butadiene-styrene ("ABS") copolymers, and the like. Among the flame-retardant agents heretofore employed in such compositions are such bromine-containing agents as tetrabromobisphenol-A, octabromodiphenyl ether, decabromodiphenyl ether, 1,2-bis(2,4,6-tribromophenoxy) ethane, bis(dibromopropyl carbonate) of tetrabromobisphenol-A, and bis(pentabromophenoxy) ethane. The prior art disclosing the use of such bromine-containing compounds as flame retardants in styrenic polymers includes U.S. Pat. No. 3,830,766, U.S. Pat. No. 3,075,944, British patent specification No. 1,372,120, and a variety of others.

Although it has thus been proposed to add various organic bromine compounds to styrenic polymers, compositions so obtained have a tendency to degrade, especially on heating. For example, when such compositions are injection molded, the degradation normally results in severe discoloration of the composition.

It is therefore desirable to include in the composition an antidegradant or stabilizer the function of which is to prevent, or at least seriously retard, deterioration of the polymer arising from decomposition of the organic bromine compound or interaction between the polymer and the organic bromine compound. Thus, the choice of suitable class of stabilizers has been a matter for considerable research even among well-known compounds.

It has heretofore been suggested that dibutyltin maleate and other organo-tin compounds be employed in halogen containing styrenic compositions (e.g., Japanese Pat. No. 72/22090 disclosing the use of 2-15% dibutyltin maleate in polystyrene containing hexabromocyclododecane as the flame-retardant; British patent specification No. 881,578 disclosing stabilized compositions comprising a polymer of a vinyl-aromatic compound, an inorganic ester of a bromo-alkanol as the flame-retardant agent, and an organo-tin compound as the stabilizer; U.S. Pat. No. 3,442,980 describing flame-retardant graft polymer blends of halogen-substituted carboxylic acids and/or acid anhydrides with acrylonitrile-butadiene-styrene graft polymer compositions containing dibutyltin maleate; and U.S. Pat. No. 3,907,932, employing hydrocarbon tin maleates and hydrocarbon tin — bis-maleate half esters).

Similarly, the prior art has individually suggested the use of hindered phenolic antioxidants and carboxylic acid anhydrides (e.g., U.S. Pat. No. 2,661,347 disclosing the stabilization of polyacrylonitrile with maleic acid and maleic anhydride; and U.S. Pat. No. 3,793,401 describing the use of up to 20% by weight of organic anhydrides in non-flame-retarded polymer compositions containing at least 50 mole-percent of polymerized unsaturated nitriles, such as acrylonitrile and methacrylonitrile, and at least 5% by weight of a diene rubber).

Use of the foregoing stabilizers in accordance with the prior art has not permitted the desired degree of thermal stability to be achieved with styrenic polymer compositions. Moreover, many of the agents suggested in the prior art have been found to be unsuited for such use in accordance with the present invention. The prior art has not suggested the unique combination of agents employed in accordance herewith, much less that synergistic results are achieved when such agents are combined as taught herein.

Accordingly, a primary object of the present invention is to provide stable, flame-retardant styrenic polymer compositions.

Another object is to provide a new and unique stabilizer composition to be employed in bromine-containing flame retardant agents specially suited for use in styrenic polymer compositions.

Yet another object is to provide a stabilizer composition that is especially effective in improving the thermal stability of flame-retardant styrenic compositions incorporating tetrabromobisphenol-A.

SUMMARY OF THE INVENTION

The foregoing and other objects, advantages, and features of this invention may be achieved with flame-retardant compositions comprising a normally combustible styrenic polymer, antimony trioxide, and a bromine-containing flame-retardant agent incorporating a stabilizing composition comprising a dialkyltin maleate of the formula

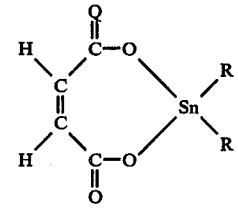

where R is a $C_1$-$C_8$ alkyl radical; a hindered phenolic antioxidant; and a member selected from the group consisting of an anhydride of a cyclic dicarboxylic acid, $C_1$-$C_8$ alkyl ester derivatives thereof, imide derivatives thereof, polymeric esters of acrylic and methacrylic acids, poly(alkene-vinyl acetate) copolymers, and poly(diallylphthalate).

Preferably, the stabilizing composition is provided in the flame-retardant styrenic polymer composition at a level of about 0.5 to 3.0 per hundred parts base polymer ("phr"), preferably about 1.0-2.0 phr.

The stabilizing composition itself preferably comprises about 50-80% by weight of the dialkyltin maleate compound; about 5-15% by weight of the hindered phenolic antioxidant; and about 5-45% by weight of said member (i.e. the third component).

This invention includes not only stabilized flame-retardant styrenic polymer compositions of the foregoing type but also stabilized flame-retardant additive compositions (i.e. flame-retardant agents incorporating the stabilizing composition) suitable for use with styrenic polymers, and the stabilizing compositions themselves.

DESCRIPTION OF THE PREFERRED EMBODIMENTS

In accordance with the present invention, antimony trioxide and bromine flame-retardant agent-containing styrenic polymer compositions may be rendered thermally stable by providing in combination therewith a unique three component stabilizing composition comprising a dialkyltin maleate of the formula

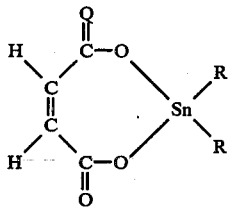

where R is a $C_1$-$C_8$ alkyl radical; a hindered phenolic antioxidant; and a member selected from the group consisting of an anhydride of a cyclic dicarboxylic acid, $C_1$-$C_8$ alkyl ester derivatives thereof, imide derivatives thereof, polymeric esters of acrylic and methacrylic acids, poly(alkene-vinyl acetate) copolymers, and poly(diallylphthlate).

The normally combustible styrenic polymers which may be stabilized and rendered flame-retardant in accordance with this invention include polystyrene, acrylonitrile-butadiene-styrene copolymers (herein called "ABS" polymers), styrene-acrylonitrile copolymers, styrene-acrylonitrile polymers alloyed with polybutadiene rubber or polybutadiene-acrylonitrile rubber, and poly(vinyl chloride)-ABS blends.

Suitable bromine-containing flame-retardants that may be employed in accordance with this invention include tetrabromobisphenol-A; octabromodiphenyl ether; 1,2-bis(2,4,6-tribromophenoxy) ethane; decabromodiphenyl ether; bis(dibromopropyl carbonate) of tetrabromobisphenol-A; and bis(pentabromophenoxy) ethane. Mixtures of flame-retardant agents, such as mixtures of decabromodiphenyl ether and tetrabromobisphenol-A, may also be employed. Other bromine-containing flame retardants that may be employed include aliphatic bromine compounds such as hexabromocyclododecane; tris(2,3-dibromopropyl) phosphate; the brominated Diels-Alder adduct of hexachlorocyclopentadiene and 1,5-cyclooctadiene characterized by the structure

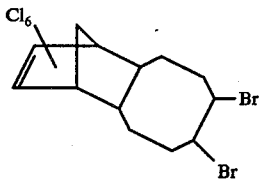

the hexabromo-derivative of bis-cyclohexenylethylene; the tetrabromo-derivative of vinyl-cyclohexene; and aromatic bromine compounds such as octabromodiphenyl; decabromodiphenyl; hexabromobenzene; pentabromotoluene; the Diels-Alder adduct of polybrominated styrene and hexachlorocyclopentadiene characterized by the structure

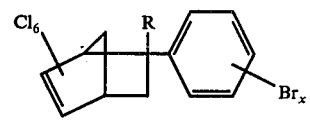

where R = H or an alkyl group and $x$ = 4,5; pentabromoethylbenzene; and the like. The utility of the disclosed stabilizing combination will be most apparent when aromatic bromine compounds are technical-grade products which commonly contain heat-sensitive impurities.

Tetrabromobisphenol-A is the preferred bromine containing flame retardant in accordance with this invention.

As mentioned, this invention has for its primary objective the provision of a unique stabilizing composition for use in flame-retardant styrenic compositions incorporating one or more of the foregoing bromine-containing flame retardant agents and antimony trioxide. The stabilizer composition comprises three essential constituents, namely, a dialkyltin maleate of the formula

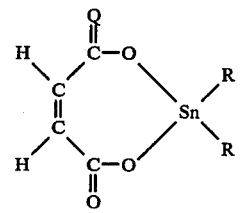

where R is a $C_1$-$C_8$ alkyl radical; a hindered phenolic antioxidant; and a member selected from the group consisting of an anhydride of a cyclic dicarboxylic acid, $C_1$-$C_8$ alkyl ester derivatives thereof, imide derivatives thereof, polymeric esters of acrylic and methacrylic acids, poly(alkene-vinyl acetate) copolymers, and poly(diallylphthalate).

Specific dialkyltin maleates that may be employed in accordance with this invention include dibutyltin maleate, dihexyltin maleate, dioctyltin maleate, dipentyltin maleate, diethyltin maleate, dimethyltin maleate, and the like. Dibutyltin maleate is preferred in accordance with this invention. Dibutyltin maleate useful in accordance with this invention may be obtained from Cincinnati Milacron Chemicals, Inc. under the trademark "ADVASTAB T-340".

Hindered phenolic antioxidants that may be employed in accordance with this invention include 2,6-di-tert-butyl-4 methylphenol; 4,4'-thio-bis(2-methyl-6-tert-butyl phenol); 2,6-di-tert-butyl-4-ethyl phenol; N,N'-hexamethylene-bis(3,5-di-tert-butyl-4-hydroxyhydrocinnamamide); octadecyl-3,5-di-tert-butyl-4-hydroxyhydrocinnamate; and tetrakis [methylene(3,5-di-tert-butyl-4-hydroxyhydrocinnamate)] methane. Mixtures of hindered phenolic antioxidants with distearyl thiodipropionate, dilaurylthiodipropionate, or phosphites may be employed.

Specific dicarboxylic anhydrides that may be employed in accordance with this invention include tetrahydrophthalic anhydride; hexahydrophthalic anhydride; styrene-maleic anhydride copolymers; 7-oxabicyclo (2.2.1) 5-heptene-2,3-dicarboxylic anhydride; 5-norborene-2,3-dicarboxylic anhydride; phthalic anhydride and corresponding anhydrides containing inert methyl groups such as methyl-tetrahydrophthalic anhydride and methyl-hexahydrophthalic anhydride. Tetrahydrophthalic anhydride is preferred in accordance with this invention.

In place of the carboxylic anhydrides, there may be employed imide dirivatives of such cyclic carboxylic acids having the group>NH, such as tetrahydrophthalimide.

Alternatively, ester derivatives of such cyclic carboxylic acids may be utilized. Suitable esters such as dibutyl phthalate, dihexyl ester of 5-norbornene-2,3-dicarboxylic acid anhydride, and dioctyl tetrahydrophthalate. Other suitable esters include esters of carboxylic acids such as $C_1$-$C_8$ alkyl esters of benzoic acid, terephthalic acid, 7-oxabicyclo [2.2.1] heptane-2,3-dicarboxylic acid, iso-phthalic acid, cinnamic acid, and phenylacetic acid.

Still further alternatively polymer esters such as poly(methyl methacrylate), poly(butylmethacrylate), poly(ethylene vinyl acetate), poly(diallyl phthalate), poly(butylene terephthalate), poly(ethylene terephthalate), and the like.

In accordance with this invention, antimony trioxide is employed in the styrene polmer composition in order to achieve highest levels of flame retardant effectiveness. If less significant levels of protection are permitted, other antimony compounds may be substituted for the antimony trioxide. Suitable antimony compounds include the sulfides of antimony, antimony salts of organic acids and their pentavalent derivatives and the esters of antimonous acids and their pentavalent derivatives. Antimony salts or organic acids and their pentavalent derivatives are also soluble. Compounds of this class include antimony butyrate, antimony valerate, antimony caproate, antimony heptylate, antimony caprylate, antimony pelargonate, antimony acetate, antimony cinnamate, antimony anisate, and their pentavalent dihalide derivatives. Likewise, the esters of antimonous acids and their pentavalent derivatives such as tris-(n-octyl) antimonite, tris(2-ethylhexyl) antimonite, tribenzyl antimonite, tris(beta-2-chlorethyl) antimonite, tris(bis-chloropropyl) antimonite, tris(beta-chlorobutyl) antimonite, and their pentavalent dihalide derivatives may be employed. Still other suitable organic antimony compounds are the cyclic antimonites such as trimethylol propane antimonite, pentaerythritol antimonite and glycerol antimonite.

Alternatively there may be employed instead of antimony compounds organic phosphates such as triphenyl phosphate, tricresyl phosphate, or inorganic additives such as zinc borate, ammonium polyphosphate, sodium antimonate, and the like.

Flame-retardant styrenic compositions of this invention may, if desired, include various additional additives. Thus, mold release agents such as metal stearates, silicone oils, paraffin waxes, and the like may be employed. Ultraviolet stabilizers such as benzylidene malonates, hydroxybenzophenones, benzotriazoles, salicylates, substituted acrylonitriles and the like can be used.

Other possible additives include pigments, dyes, optical brighteners, antistatic agents, other antioxidants (e.g. distearyl thiodipropionate, phosphites, and the like), and fillers, such as glass, fumed colloidal silica, silicon carbide, and the like.

The stabilized flame-retardant styrenic polymer compositions in accordance with this invention preferably employ the bromine-containing flame-retardant agent at a level of about 4-30 parts per hundred parts ("phr")

base polymer. Antimony trioxide is desirably used at a level of about 2-15 phr base polymer.

Where the styrenic polymer is an ABS resin and it is desired to achieve the highest levels of flame retardancy, the compositions of this invention preferably contain about 21-26 phr tetrabromobisphenol-A and about 4-6 phr antimony trioxide. Where the flame-retardant agent is octabromodiphenyl ether, it is preferably employed in the range of about 15-18 phr, with antimony trioxide being used 6-8 phr.

For flame retardant polystyrene compositions employing tetrabromobisphenol-A, it is preferably provided at a level of about 18 phr, with about 4 phr antimonytrioxide being utilized. Where decabromodiphenyl ether and antimony trioxide are employed, such materials are present at preferred levels of about 10-12 phr and 4-6 phr, respectively.

In all cases, stabilizing compositions of this invention are employed in the styrenic polymer at a level of about 0.5 to about 3.0 phr base polymer, preferably about 1.0 to about 2.0 phr.

Where the stabilizing compositions are incorporated with the bromine-containing flame-retardant agent to form a stabilized flame-retardant additive composition suitable for subsequent incorporation in a styrenic polymer, the stabilizing composition is employed at a level of about 1-60 parts per hundred parts bromine-containing flame-retardant agent, preferably about 1-25 phr.

Generally speaking, the stabilizing mixture itself comprises about 50-80% by weight of the dialkyltin maleate compound; about 5-15% by weight hindered phenolic antioxidant; and about 5-45% by weight of the third component.

The compositions of this invention may be formulated in any desired manner. For example, the styrenic polymer, antimony trioxide, bromine-containing flame-retardant agent, and stabilizing composition may be intimately mixed using typical plastics processing equipment such as an extruder, two-roll mills, Banbury mixer, BRABENDER PLASTI-CORDER, or the like. The particular equipment employed is not critical, it only being necessary to provide a mixture of the constituents.

Alternatively, the bromine-containing flame-retardant agent may be formulated in combinations with the stabilizing composition using the same techniques, with the stabilized bromine-containing flame-retardant additive composition subsequently being incorporated in a styrenic polymer.

So too, the constituents of the stabilizing composition may individually be added directly to the styrenic polymer or to the bromine-containing flame-retardant agent, or such constituents may first combined to form the stabilizing composition which may then be added to the polymer or agent.

An especially preferred stabilizing composition in accordance with this invention is illustrated in the following Example.

EXAMPLE I

| Constituent | Parts by Weight |
|---|---|
| Dibutyltin maleate | 56.7 |
| 2,6-di-tert-butyl-4-methyl phenol | 10.0 |
| Tetrahydrophthalic anhydride | 33.3 |
| | 100.0 |

Other dialkyltin maleates, hindered phenolic anti-oxidants, and carboxylic acid anhydrides and other derivatives thereof may be substituted for the constituents given in Example I in accordance with this invention.

Exemplary stabilized bromine-containing-flame-retardant addition compositions are given in the following Examples.

conditions. "Cream" appearance is next best, with "Dark Cream Tan", "Tan", and "Dark Tan" indicating more significantly discolored stocks. These visual appearance observations can be expressed on a scale of 1–5, with #1 being "Light Cream" and #5 being "Dark Tan." Numerical results are given in TABLE 1.

TABLE I

| FORMULATION NUMBER | STABILIZERS PRESENT (phr) | FORMULATION APPEARANCE VALUE |
|---|---|---|
| 1 | None | 5 |
| 2 | Dibutyltin maleate (1.5) | 3 |
| 3 | 2,6-di-tert-butyl-4-methyl phenol (1.5) | 5 |
| 4 | tetrahydrophthalic anhydride (1.5) | 5 |
| 5 | Dibutyltin maleate (0.75) tetrahydrophthalic anhydride (0.75) | 2 |
| 6 | 2,6-di-tert-butyl 1-4-methyl phenol (0.75) tetrahydrophthalic anhydride (0.75) | 5 |
| 7 | Dibutyltin maleate (0.75) 2,6-di-tert-butyl-4-methyl phenol (0.75) | 3 |
| 8 | Dibutyltin maleate (0.75) tetrahydrophthalic anhydride (0.25) 2,6-di-tert-butyl-4-methyl phenol (0.50) | 1 |

EXAMPLE II

| Constituent | Parts by Weight |
|---|---|
| Tetrabromobisphenol-A | 94 |
| Stabilizing composition (Example I) | 6 |
| | 100 |

EXAMPLE III

| Constituent | Parts by Weight |
|---|---|
| Octobromodiphenyl ether | 96 |
| Stabilizing composition (Example I) | 4 |
| | 100 |

EXPERIMENTAL EVALUATIONS

EXAMPLE IV

A number of ABS resin formulations were prepared as follows: Each of the following formulations contained 100 parts CYCOLAC T (molding grade of ABS resin available from MARBON Division of Borg-Warner Corporation), 24 parts tetrabromobisphenol-A, 6 parts antimony trioxide, and various combinations of stabilizing agents as listed in TABLE 1. The formulations were prepared using a BRABENDER PLASTI-CORDER MODEL PL-V300 with a laboratory mixing head of 60 milliliter capacity, equipped with roller-type removable blades, operating at 50 rpm for a period of 8 minutes at 160° C. After the mixing period, the processed composition was removed from the BRABENDER PLASTI-CORDER and hydraulically pressed at 475° F into 6 × 3 × ⅛ inch sheets. The sheets were maintained in the press for a total of 15 minutes.

Visual observations were then made of the appearance of the polymer formulations. "Light Cream" appearance is most desirable as it indicates that the formulation discolored the least under the above processing conditions.

The data of Table I demonstrate the unexpected utility of the specific combination of three constituents as stabilizers for tetrabromobisphenol-A — ABS resin formulations. Only through the use of the three constituent combination of dibutyltin maleate, tetrahydrophthalic anhydride and 2,6-di-tert-butyl-4-methyl phenol is the highest level of thermal stabilization achieved.

Formulations 1–8 were tested for flame-retardancy in accordance with UL-94 "Tests for Flammability of Plastic Materials for Parts in Devices and Appliance." This test provides that materials classed 94V-O shall:

A. Not have any specimens which burn with flaming combustion for more than 10 seconds after each application of the test flame.

B. Not have a total flaming combustion time exceeding 50 seconds for the 10 flame applications for each set of 5 specimens.

C. Not have specimens which burn with flaming or glowing combustion up to the holding clamp.

D. Not have specimens which drip flaming particles that ignite the dry absorbent surgical cotton located 12 inches (305mm) below the test specimen.

E. Not have specimens with flowing combustion which persists beyond 30 seconds after the second removal of the test flame.

All the formulations met the criteria for a V-O rating at ⅛ inch, the most difficult rating to achieve in this test. In general, the total burn times were on the order of less than 10 seconds.

EXAMPLE V

A number of ABS formulations similar in composition to Formulation No. 8 were then prepared in the foregoing manner with the exception that the tetrahydrophthalic anhydride was replaced with other cyclic carboxylic acid anhydrides or derivatives. The formulations were evaluated as described in Example IV, and the results are given in Table II.

TABLE II

| FORMULATION NUMBER | ANHYDRIDE | FORMULATION APPEARANCE VALUE |
|---|---|---|
| 9 | Poly(ethylene-vinyl acetate) | 1 |
| 10 | Styrene-maleic anhydride copolymer | 1 |
| 11 | 7-oxabicyclo[2.2.1]5-heptene-2,3-dicarboxylic anhydride | 1 |
| 12 | 5-norbornene-2,3-dicarboxylic anhydride | 1 |

TABLE II-continued

| FORMULATION NUMBER | ANHYDRIDE | FORMULATION APPEARANCE VALUE |
|---|---|---|
| 13 | Dibutyl phthalate | 1 |
| 14 | Tetrahydrophthalimide | 1 |
| 15 | Succinic anhydride | 1* |
| 16 | Ethylene-maleic anhydride copolymer | 1* |
| 17 | Pyromellitic dianhydride | 1* |
| 18 | Maleic anhydride | 1* |

*Although exhibiting desirable color, Formulation 15-18 had a film on the stock surface (commonly referred to an "additive bleed out"), and Formulations 16-18 also had gas bubbles. Thus, Formulations 15-18 are unsatisfactory and are outside the scope of this invention.

EXAMPLE VI

Using a somewhat different preparation and evaluation technique, another series of ABS formulations was prepared containing 100 parts ABS, 24 parts tetrabromobisphenol-A, 6 parts antimony trioxide and various combinations of stabilizers as disclosed in this invention. In this series of experiments, the formulations were prepared using the BRABENDER PLASTI-CORDER operating at 50 rpm at a temperature of 230° C. After every 4 minute interval, the PLASTI-CORDER was briefly stopped and a ¼ inch diameter chip of plastic was removed, using a modified pair of pliers. The results, are recorded in Table III. The longer the time to tan discoloration the more effective the stabilizer.

TABLE III

| FORMULATION NUMBER | STABILIZERS PRESENT (phr) | TIME (MINUTES TO TAN DISCOLORATION) |
|---|---|---|
| 19 | None | 8 |
| 20 | Dibutyltin maleate (1.5) | 8-12 |
| 21 | Dibutyltin maleate (1.3) 2,6-di-tert-butyl-4-methyl phenol (0.2) | 12 |
| 22 | Dibutyltin maleate (0.85) 2,6-di-tert-butyl-4 methyl phenol (0.15) tetrahydrophthalic anhydride (0.50) | 16 |
| 23 | tetrahydrophthalic anhydride (1.5) | 8 |

These examples further illustrate the utility of the stabilizer combination disclosed in this invention.

EXAMPLE VII

In order to demonstrate the utility of the stabilizer combination described in this invention, a number of other ABS formulations containing representative bromine-containing flame-retardant additives were prepared. These formulations were processed in the BRABENDER PLASTI-CORDER at 160° C at 50 rpm for 8 minutes. Press conditions were 475° C for 15 minutes. The formulations consisted of 100 parts of CYCOLAC T, 24 parts of flame-retardant, 6 parts antimony trioxide with and without 2 parts of stabilizing composition of Example I and gave the results shown in TABLE IV.

TABLE IV

| FORMULATION NUMBER | FLAME - RETARDANT | STABILIZING POSITION PRESENT | FORMULATION APPEARANCE |
|---|---|---|---|
| 24 | 1,2-bis(2,4,6-tribromophenoxy) ethane | No | Gray |
| 25 | " | Yes | Off-White |
| 26 | Octabromodiphenyl ether | No | Gray |
| 27 | " | Yes | Cream |

EXAMPLE VIII

The utility of the stabilizing compositions of this invention was demonstrated in a number of polystyrene formulations prepared in the following manner. Each of the formulations contained 100 parts COSDEN 825 TVP-1 (high impact polystyrene available from COSDEN OIL), 15-20 parts flame-retardant, 4 parts antimony trioxide, with and without 1.5 parts of the Example I stabilizing composition. The data are given in Table V.

TABLE V

| FORMULATION NUMBER | FLAME-RETARDANT (phr) | STABILIZING COMPOSITION PRESENT | FORMULATION APPEARANCE |
|---|---|---|---|
| 28 | Tetrabromobisphenol-A (20) | No | Dark Cream |
| 29 | " | Yes | White |
| 30 | Decabromodiphenyl Ether (15)* | No | Gray |
| 31 | " | Yes | Cream |
| 32 | bis(dibromopropyl carbonate) of tetrabromobisphenol-A(20) | No | Gray |
| 33 | " | Yes | Off-White |

*The decabromodiphenyl ether evaluated was a technical-grade product, which, when heated in a test tube at 300° C for 30 minutes, discolored to a black color.

Stabilized, flame-retardant styrenic polymers produced in accordance with this invention are useful as appliance housings and internal parts, cabinets and parts thereof for television sets, business machine housings, components of telecommunications equipment, and the like.

We claim:

1. A stabilized flame-retardant polymer composition comprising a normally combustible styrenic polymer, about 2-15 phr antimony trioxide, about 4-30 phr of a bromine-containing flame retardant agent, and about 0.5-3.0 phr of a stabilizing composition comprising:

about 50-80% of a dialkyltin maleate of the formula

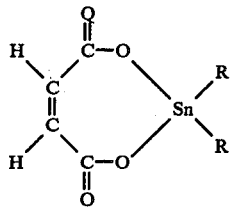

where R is a $C_1-C_8$ alkyl radical;
about 5-15% of a hindered phenolic antioxidant; and
about 5-45% of a member selected from the group consisting of an anhydride of a cyclic dicarboxylic acid, $C_1-C_8$ alkyl ester derivatives thereof, imide derivatives thereof, polymeric esters of acrylic and methacrylic acids, poly(alkene-vinyl acetate) copolymers, and poly(diallylphthalate), by weight of the stabilizing composition.

2. A stabilized flame-retardant polymer composition, as claimed in claim 1, wherein the styrenic polymer is an acrylonitrile-butadiene-styrene copolymer and the flame-retardant agent is tetrabromobisphenol-A.

3. A stabilized flame-retardant polymer composition, as claimed in claim 1, wherein the said styrenic polymer is polystyrene.

4. A stabilized flame-retardant polymer composition, as claimed in claim 1, wherein said dialkyltin maleate is dibutyltin maleate.

5. A stabilized retardant polymer composition, as claimed in claim 1, wherein the antioxidant is 2,6-di-tert-butyl-4-methyl phenol.

6. A stabilized flame-retardant polymer composition, as claimed in claim 1, wherein the member is tetrahydrophthalic anhydride.

7. A stabilized flame-retardant additive composition comprising a bromine-containing flame-retardant agent and about 1-60 parts per hundred parts of the flame-retardant agent of a stabilizing composition comprising:
about 50-80% of a dialkyltin maleate of the formula

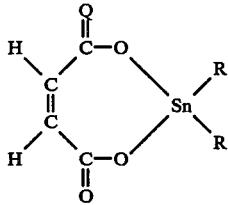

where R is a $C_1-C_8$ alkyl radical;
about 5-15% of a hindered phenolic antioxidant; and
about 5-45% of a member selected from the group consisting of an anhydride of a cyclic carboxylic acid, $C_1-C_8$ alkyl ester derivatives thereof, imide derivatives thereof; polymeric esters of acrylic and methacrylic acids, poly(alkene-vinyl acetate) copolymers, and poly(diallyl phthalate), by weight of the stabilizing composition.

8. A stabilized flame-retardant additive composition, as claimed in claim 7, wherein the flame-retardant agent is tetrabromobisphenol-A.

9. A stabilized flame-retardant additive composition, as claimed in claim 7, wherein the flame-retardant agent is a member selected from the group consisting of decabromodiphenyl ether and mixtures thereof with tetrabromobisphenol-A.

10. A stabilized flame-retardant additive composition, as claimed in claim 7, wherein the flame-retardant agent is a member selected from the group consisting of octabromodiphenyl ether and 1,2-bis(2,4,6-tribromophenoxy) ethane.

11. A stabilized flame-retardant additive composition, as claimed in claim 7, wherein the dialkyltin maleate is dibutyltin maleate.

12. A stabilized flame-retardant additive composition, as claimed in claim 7, wherein the antioxidant is 2,6-di-tert-butyl-4-methyl phenol.

13. A stabilized flame-retardant additive composition, as claimed in claim 7, wherein the member is tetrahydrophthalic anhydride.

14. A stabilized flame-retardant additive composition comprising tetrabromobisphenol A and about 1-25 parts per hundred parts of tetrabromobisphenol-A of a stabilizing composition comprising about 50-80% dibutyltin maleate, about 5-10% 2,6-di-tert-butyl-4-methyl phenol; and about 5-45% tetrahydrophthalic anhydride, by weight of the stabilizing composition.

15. A stabilizing composition adapted for use with a bromine-containing flame retardant agents and comprising:
about 50-80% of a dialkyltin maleate of the formula

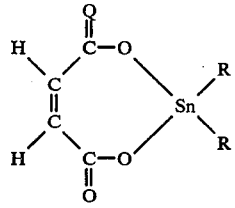

where R is a $C_1-C_8$ alkyl radical;
about 5-15% of a hindered-phenolic antioxidant; and
about 5-45% of a member selected from the group consisting of an anhydride of a cyclic carboxylic acid, $C_1-C_8$ alkyl ester deribatives thereof, imide derivatives thereof; polymer esters of acrylic and methacrylic acids, poly(alkene-vinyl acetate) copolymers, and poly(diallylphthlate), by weight of the stabilizing composition.

16. A stabilizing composition, as claimed in claim 15, wherein the dialkyltin maleate is dibutyltin maleate; the antioxidant is 2,6-di-tert-butyl-4-methyl phenol; and the said member is tetrahydrophthalic anhydride.

* * * * *